Jan. 28, 1941.　　　S. W. RUSHMORE　　　2,230,069
NONVIBRATORY SPRING
Filed July 4, 1939
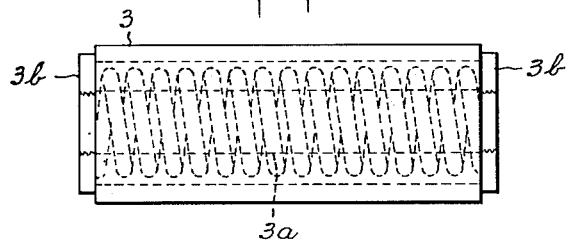
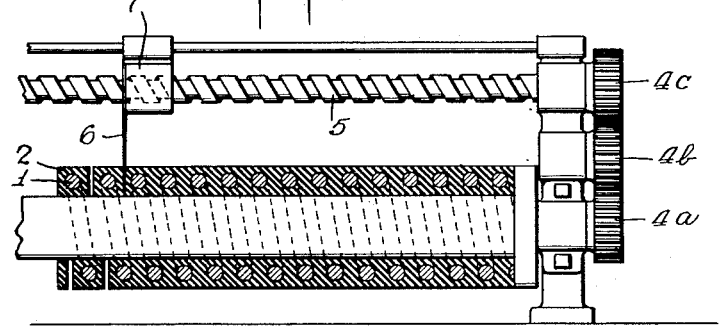
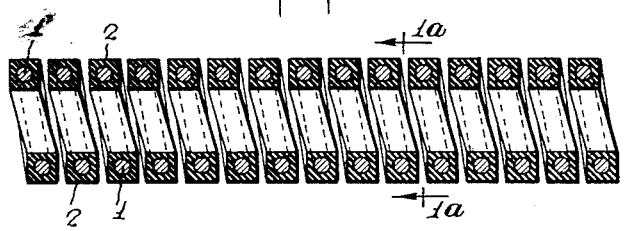 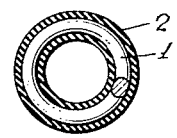
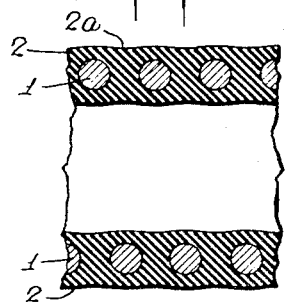 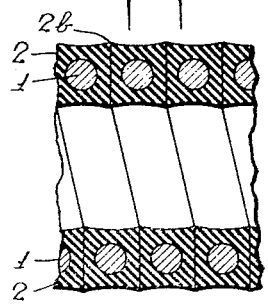
INVENTOR
Samuel W. Rushmore
BY
George C. Dean
ATTORNEY Patented Jan. 28, 1941

2,230,069

UNITED STATES PATENT OFFICE 2,230,069

NONVIBRATORY SPRING

Samuel W. Rushmore, Plainfield, N. J.

Application July 4, 1939, Serial No. 282,771

4 Claims. (Cl. 267—33)

My present invention relates more particularly to helical compression springs employed in high speed mechanism such as automotive internal combustion engines; and the primary object is to overcome one of the chief difficulties encountered in employment of such springs, namely, inter-coil, elasticity-inertia vibrations, super-posed on the normal compression and expansion movements of the coil as a whole. Such inter-coil vibrations tend to build up mechanical resonance effects which in some cases impose strains and fiber stresses considerably in excess of those imposed by normal cycles of compression and expansion; so that it is necessary to employ springs much heavier than would be required, with consequent large increase of the duty imposed upon the related parts. In certain cases these inter-coil vibrations are of great violence such that the spring will sometimes thrash and surge so much that the coils of the spring seeming to disappear in a sort of haze accompanied by loud humming or rattling sound.

In the case of high speed automotive engines which are operated over a very wide range of speed, these resonantly built-up surgings may be of a most complicated and incalculable character. Sometimes inter-coil vibrations set up in one cycle of opening and closing the valve, will carry over into a succeeding cycle, and at certain speeds will build up to such violence as to exceed the fatigue limit of the spring material, sometimes causing premature failure of the spring; or, at least, seriously interfering with the proper functioning of the valve on which the spring is employed.

By my present invention, such super-posed vibrations are avoided, usually by preventing their initiation; or, at least damping them out before they can build up. This is accomplished by encasing the coil in a suitably vulcanized rubber coating such that the energy of the free elastic oscillations will be absorbed.

Any such coating, especially when made properly adherent or "welded" to the metal surface of the spring, will have marked effect in tending to damp out such oscillations, partly by mechanical hysteresis, resulting from its elastically applied inertia and the internal friction within the mass of the rubber; and partly from its increased "sail area" and friction with the air.

However, a feature of my invention which is far more effective than any or all of the foregoing, is designing the rubber coating so that the surfaces of the adjacent convolutions of the rubber casing will come in contact, and will be slightly compressed, when the spring is at or near the end of its compression stroke. The result is that substantially all elastic movement of the convolutions which are independent of the forced compression and expansion movement, are suppressed and extinguished during each cycle of operation, so that at the start of each new compression stroke, the coils will be substantially free of vibratory movement.

An important feature of my invention is a method whereby I coat the spring while under compression. This is particularly adapted for achieving my above objective of contact of adjacent inter-coil rubber faces, and the desired slight compression of the rubber at the end of the compression stroke. The preferred method is to compress the spring nearly, but not quite to maximum compression for which the spring is designed; and, while so compressed in a mold, vulcanize the rubber coating thereon. Preferably, this is done in a cylindrical mold having a cylindrical core. When the thus encased spring is removed from the mold and allowed to expand, it stretches the rubber between convolutions and the coating is then slit helically midway between coils. As the length of such inter-coil stretching of the rubber is usually slight (something like $\frac{1}{32}$nd of an inch between adjacent coils, in the case of a conventional high speed automotive engine valve), the rubber coating, when slit as above, will have a cross-section which is approximately rectangular, affording flat surfaces for the above described hysteresis effect, or the inter-coil cushioning effect, or both, and preferably the over-all radial thickness of the rectangle will be equal to or greater than the longitudinal thickness.

The above and other features of my invention will be more evident from the following description in connection with the accompanying drawing, in which Fig. 1 shows a desirable form of spring, coated with rubber in accordance with my present invention;

Fig. 1a is a section on the line 1a—1a, Fig. 1;

Fig. 2 indicates more or less diagrammatically a mold in which the spring may be held under compression while the rubber coating is vulcanized thereon;

Fig. 3 is a side elevation of a type of lathe cutter, for cutting the inter-coil helical slit in the rubber coating, the coated spring being shown in axial section;

Fig. 4 is a detail section showing the rubber coated spring after it has been released from compression and before slitting; and Fig. 5 is a similar view showing the slight expansion of the rubber at inter-coil surfaces of contact, when the spring is under maximum compression.

In Fig. 1, the helical spring 1 is shown as having a rubber coating 2, which in this case is substantially square in cross-section. Obviously, such a coating will tend to damp out inter-coil vibrations merely as a result of its elastically applied inertia load on the spring, regardless of whether or not the adjacent surfaces of the coil are or are not designed to come into actual contact at or before maximum compression for which the spring is designed.

While it might be possible to mold the coating itself as helix, by using a mold having a helical partition element designed to shape the rectangular cross-section in the mold, I prefer to compress the spring by a distance equal to the sum of the spaces between the coils, and while so compressed, embed the entire coil in a mass of rubber, which is then vulcanized thereon. As indicated in Fig. 2, such a mold may comprise an outer cylinder 3 and a mandrel 3a having heads 3b, 3b, either or both of which may be screwthreaded to the mandrel for compressing the spring and end-closing the mold.

A solid cylinder of soft rubber filling the interspace is vulcanized to the required degree of resilient stiffness. When this process is completed, the spring is removed, and being freed from compression, the vulcanized, but relatively soft rubber, will stretch so that the original outer and inner cylinder surfaces become wavy, somewhat as indicated at 2a, 2a, in the relatively large scale view, Fig. 4. In this condition, the tube shown in Fig. 4 is crowded onto mandrel 3a, which through gears 4, 4a, 4b, is rotated in synchronism with a lead screw 5, the threads of which are of pitch suitable for causing the carriage 6 of slitting knife 7 to travel longitudinally to cut off a helix midway between adjacent coils of the spring. Preferably, the cutting edge of this knife is substantially in a radius of right angles to the axis of the spring, and the blade is preferably skewed laterally, so that widthwise its pitch angle is the same as the pitch of the helix.

The mandrel and spring carried thereby being rotated, the knife acts after the manner of a thread-cutting lathe tool, to slit the coil. This slit registers with the maximum tension depression 2a between adjacent coils, with the result that as slitting progresses the rubber springs back to cylindrical outline, affording clearance for the rear edge of the blade, as indicated in Fig. 3.

As the compression of the spring during the molding process was nearly as great, but slightly less than maximum compression for which the spring is designed, it follows that inter-coil surfaces of the rubber coating will contact just before the instant of maximum compression of the spring, whereupon the contacting surfaces will be elastically spread to the concave outline indicated at 2b, 2b, Fig. 5.

It is to be noted that although at first thought, soft, resilient rubber would seem hardly suitable for employment with so highly stressed a member as an engine valve spring, still, in the present application, the unit pressures and the energy dissipation are so small in amount that very long life may be expected even under the most severe conditions of service.

In the case of a laboratory set up which I have tested, using a standard valve and spring from a 108 H. P. Crane-Simplex engine, the spring had 15 turns, when fully compressed in service by its normal 3/8 inch cam lift, it was about 3 inches in over-all length, and had an outside diameter of about 1½ inches. With this 3/8 inch cam lift, the actual movement between adjacent coils is less than 1/32" and a part of even this small movement is after the rubber surfaces have come into contact.

The above dimensions give about 60 inches length of rubber encased coil, or a total (60×2×⅜) of about 40 square inches of flat rubber surfaces in contact at the moment of maximum compression, when surging is initiated. There being only the vertical contact, without any side motion or scuffing, there should be no appreciable wear of the rubber surfaces over an indefinite period.

It is important to remember that the rubber compound is "vulcanized" to the spring coil by modern methods which gives a bond that will not let go before the rubber itself has completely failed or disintegrated elsewhere than at the bond.

I claim:

1. A method of rendering non-vibratory, a helical compression spring of the type used for closing cam-opened poppet valves of high speed internal combustion engines, throughout high-speed cycles of compression and expansion while under high minimum pressure, said method including compressing the spring to pressure slightly less than the maximum for which it is designed; then, while so compressed embedding it in a cylindrical mass of soft rubber; then vulcanizing the rubber; then releasing the pressure to permit expansion of the spring, thereby stretching the rubber between the helical convolutions of the spring; and finally slitting the rubber approximately midway between said convolutions.

2. The method of making a rubber covered helical spring designed for use under conditions of a limited range of compression which includes compressing the spring to approximately its designed maximum working pressure, then while so compressed embedding it in a cylindrical mass of rubber, then vulcanizing or curing the rubber, permitting the spring to expand and finally slitting the rubber intermediate of the spring convolutions.

3. The method of making a rubber covered helical spring designed for use under conditions of a limited range of compression which includes compressing the spring to a pressure slightly less than the maximum designed working pressure, then while so compressed embedding it in a cylindrical mass of rubber, then vulcanizing or curing the rubber, permitting the spring to expand and finally slitting the rubber intermediate of the spring convolutions whereby in use the rubber will be slightly compressed when the spring is compressed to the full designed working compression.

4. The method of making a rubber covered helical spring of the type described which includes compressing the spring to a degree slightly less than the maximum designed working pressure, then while so compressed embedding it in a cylindrical mass of rubber, then curing the rubber, then releasing the pressure to permit partial expansion of the spring thereby stretching the rubber between the convolutions of the spring and finally slitting the rubber intermediate of the spring convolutions whereby when used the rubber will be slightly compressed when the spring is compressed to the full designed working compression.

SAMUEL W. RUSHMORE.